(12) United States Patent
Matsuda et al.

(10) Patent No.: US 8,308,998 B2
(45) Date of Patent: Nov. 13, 2012

(54) POLARIZING FILM, COATING LIQUID, AND IMAGE DISPLAY

(75) Inventors: Shoichi Matsuda, Ibaraki (JP); Kyoko Ishii, Ibaraki (JP); Sadahiro Nakanishi, Ibaraki (JP); Tadayuki Kameyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 91 days.

(21) Appl. No.: 12/763,737

(22) Filed: Apr. 20, 2010

(65) Prior Publication Data

US 2010/0288166 A1  Nov. 18, 2010

(30) Foreign Application Priority Data

May 18, 2009 (JP) ................................. 2009-119395

(51) Int. Cl.
*B29D 7/01* (2006.01)
*C09B 35/027* (2006.01)
(52) U.S. Cl. ....... 264/1.34; 8/662; 106/287.62; 534/832
(58) Field of Classification Search ................ 8/662
See application file for complete search history.

(56) References Cited

FOREIGN PATENT DOCUMENTS

JP  2006-323377 A  11/2006
JP  2008102417 A  *  5/2008

OTHER PUBLICATIONS

English machine translation of JP 2008-102417 to Nishimura et al., accessed online at AIPN translator on Aug. 31, 2011.*

* cited by examiner

*Primary Examiner* — Harold Pyon
*Assistant Examiner* — Katie L Hammer
(74) *Attorney, Agent, or Firm* — Westerman, Hattori, Daniels & Adrian, LLP

(57) ABSTRACT

The polarizing film of the present invention contains the azo compound represented by the following general formula (I).

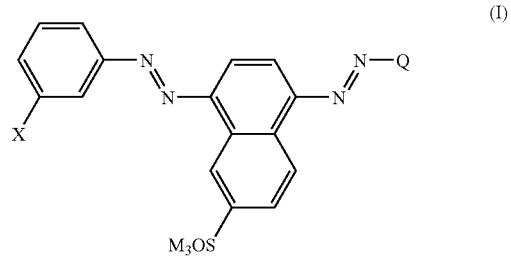

In the general formula (I), Q represents a substituted or unsubstituted aryl group, X represents a cationic group, a nitro group, a cyano group, or a hydroxyl group, and M represents a counter ion.

11 Claims, 1 Drawing Sheet

POLARIZING FILM, COATING LIQUID, AND IMAGE DISPLAY

FIELD OF THE INVENTION

The present invention relates to a polarizing film exhibiting a high dichroic ratio, and a coating liquid for forming the polarizing film.

DESCRIPTION OF THE RELATED ART

Polarizing films are optical members having such functions as to allow certain linearly polarized light in polarized light or natural light to transmit.

Generic polarizing films can be obtained by stretching a polyvinyl alcohol film dyed with iodine, for example.

In addition, polarizing films obtained in accordance with a solution casting method in which a solution containing an azo compound with lyotropic liquid crystalline property is coated on a substrate are known.

For example, Example 16 in Patent Document 1 discloses a polarizing film obtained by coating, onto a substrate, a coating liquid containing an azo compound having a 7-sulfo-1,4-naphthylene group.

(Patent Document 1) Japanese Unexamined Patent Publication No. 2006-323377

SUMMARY

The polarizing film in Patent Document 1 is obtained by coating the coating liquid; thus, the thickness thereof can be made small. However, the polarizing film in Patent Document 1 is low in dichroic ratio, and does not have sufficient polarization properties.

A first object of the present invention is to provide a polarizing film exhibiting a high dichroic ratio.

A second object of the present invention is to provide a coating liquid for forming a polarizing film which exhibits a high dichroic ratio and has a relatively thin thickness.

In general, an azo compound dissolved in a solvent forms supermolecular aggregates in the solution, thereby expressing a liquid crystal phase. As the supermolecular aggregates are in a stabler state, the alignment property of the azo compound is made better. The inventors have found an azo compound that exhibits a good alignment property in solution state, thereby completed the present invention.

A polarizing film of the present invention contains an azo compound represented by the following general formula (I).

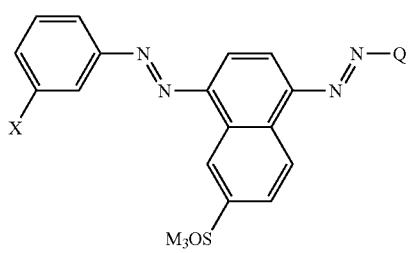

In the general formula (I), Q represents a substituted or unsubstituted aryl group, X represents a cationic group, a nitro group, a cyano group, or a hydroxyl group, and M represents a counter ion.

In the preferable polarizing film of the present invention, X is a cationic group or a nitro group.

In the preferable polarizing film of the present invention, the cationic group is an —NHR group or a —CONHR group. The R represents a hydrogen atom, a methyl group, an ethyl group, a methoxy group, or an ethoxy group.

In another aspect of the present invention, a coating liquid is provided.

The coating liquid contains the azo compound represented by the above general formula (I) and a solvent.

In another aspect of the present invention, an image display is provided.

The image display has any one of the polarizing films described above as a constituting member.

Since the polarizing film of the present invention contains the azo compound represented by the general formula (I), the film exhibits a high dichroic ratio. Moreover, the polarizing film of the present invention can be produced by a solution casting method using a coating liquid containing the azo compound. Therefore, a relatively thin polarizing film can be provided.

The coating liquid of the present invention contains the azo compound represented by the general formula (I). By coating the coating liquid on a proper substrate, a polarizing film which exhibits a high dichroic ratio and has a relatively thin thickness can be obtained easily.

Figure 1:
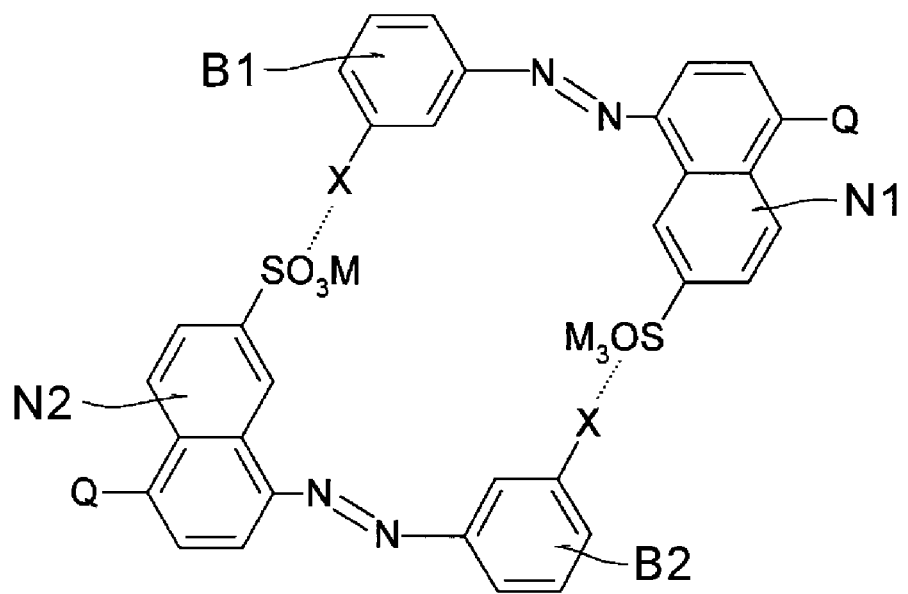
FIG. 1 is a schematic reference view illustrating a state that molecules of an azo compound are bonded to each other.

DETAILED DESCRIPTION OF THE INVENTION (Polarizing Film)

A polarizing film of the present invention contains an azo compound represented by the following general formula (I).

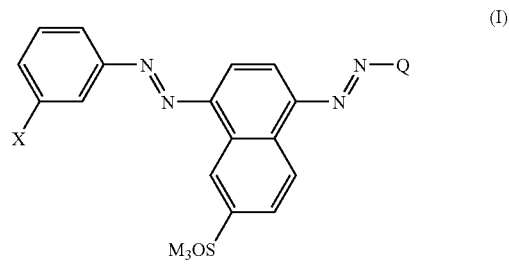

In the general formula (I), Q represents a substituted or unsubstituted aryl group, X represents a cationic group, a nitro group, a cyano group, or a hydroxyl group, and M represents a counter ion.

In the present specification, the wording "substituted or unsubstituted" means that the group modified with the wording has a substituent or has no substituent.

In the present specification, the expression "Y to Z" means the range of Y or more and Z or less.

Examples of the aryl group represented by Q include a phenyl group, and condensed ring groups wherein two or more benzene rings are condensed to each other such as a naphthyl group. The aryl group as Q may or may not have a substituent. Whether the aryl group is substituted or unsubstituted, the azo compound represented by the formula (I), which has a —SO₃M group, has solubility in a solvent.

Q is preferably a substituted or unsubstituted phenyl group, or a substituted or unsubstituted naphthyl group, and more preferably a substituted or unsubstituted naphthyl group, and particularly preferably a 2-naphthyl group having a substituent.

When the aryl group has a substituent, examples of the substituent include an alkyl group having 1 to 6 carbon atoms, an alkoxy group having 1 to 6 carbon atoms, an alkylamino group having 1 to 6 carbon atoms, a phenylamino group, an acylamino group having 1 to 6 carbon atoms, a hydroxyalkyl group having 1 to 6 carbon atoms such as a dihydroxypropyl group, a carboxyl group, a sulfonic acid group such as an —SO₃M group, a hydroxyl group, a cyano group, a nitro group, an NHR group such as an amino group, and a halogen group. The substituent is preferably at least one selected from a sulfonic acid group, a hydroxyl group, a cyano group, a nitro group, and an NHR group. In the NHR group, R represents a hydrogen atom, an alkyl group having 1 to 3 carbon atoms, or an acyl group having 1 to 3 carbon atoms. R is preferably a hydrogen atom, a methyl group, or an acetyl group (—COCH₃), and more preferably a hydrogen atom. The aryl group may have two or more substituents each of which has been exemplified above. The azo compound that has an aryl group having the substituents is particularly good in water-solubility.

Specific examples of Q include groups represented by the following formulae (a) to (l):

(a)

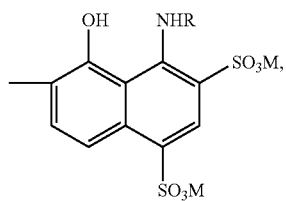

(b)

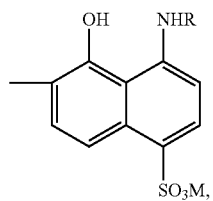

(c)

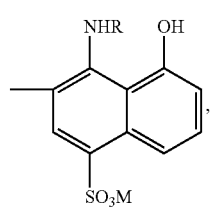

(d)

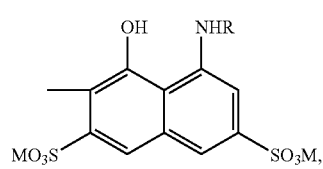

-continued (e)

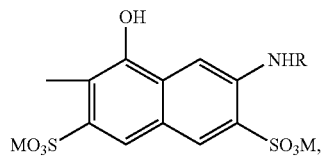

(f)

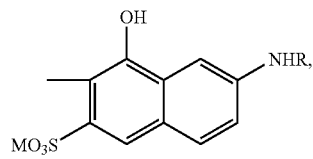

(g)

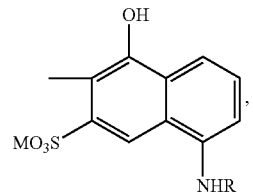

(h)

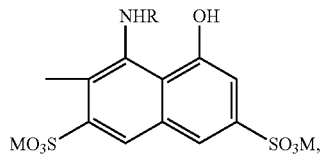

(i)

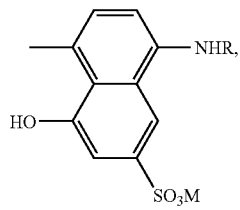

(j)

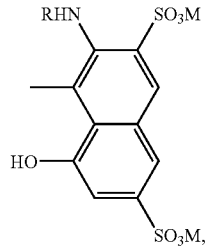

(k)

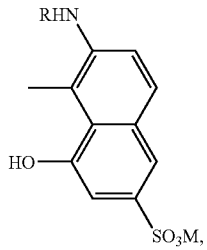

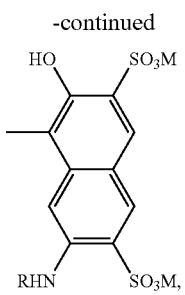

(I)

Among azo compounds each represented by the general formula (I), the azo compound represented by the following general formula (II) is preferable, and the azo compound represented by the following general formula (III) is more preferable in the present invention:

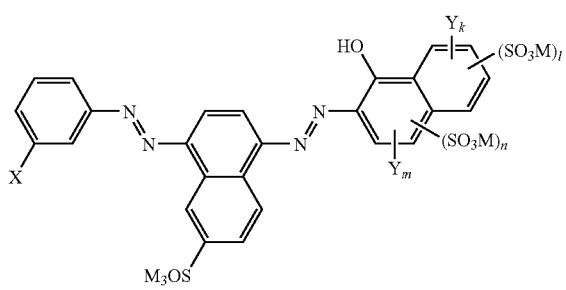

(II)

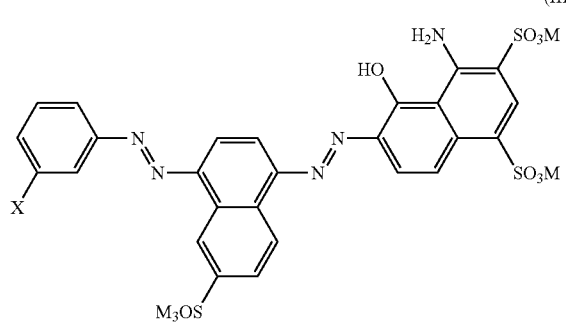

(III)

In the formula (II), any Y represents a hydroxyl group, or an —NHR group wherein R represents a hydrogen atom, an alkyl group having 1 to 3 carbon atoms, or an acyl group having 1 to 3 carbon atoms, and preferably represents a hydrogen atom; k and m each represent the number of the substituent(s) represented by Y('s); l and n each represent the number of substituent(s) represented by the —$SO_3M$ group(s); and k and l are each an integer of 0 to 4, and m and n are each an integer of 0 to 2 provided that k+l=1 to 4, and m+n=0 to 2. In the formula (II), k is preferably an integer from 0 to 2 and more preferably an integer from 1 to 2, 1 is preferably an integer from 0 to 4 and more preferably an integer from 1 to 3. In the formula (II), m and n are each preferably an integer from 0 to 1. In the formula (II) and the formula (III), any M and any X have the same meanings as in the formula (I).

In each of the formulae (I), (II) and (III), X represents a cationic group, a nitro group, a cyano group, or a hydroxyl group. Examples of the cationic group include an —NHR group such as an amino group, a —CONHR group, an ammonium base, and salts thereof. Examples of the salts include hydrochlorides, sulfates, and phosphates. In each of the —NHR groups and the —CONHR groups, R represents a hydrogen atom, an alkyl group having 1 to 3 carbon atoms, or an acyl group having 1 to 3 carbon atoms. R is preferably a hydrogen atom, a methyl group, or an acetyl group (—$COCH_3$), and more preferably a hydrogen atom.

In each of the formulae (I), (II) and (III), X is preferably a cationic group or a nitro group, and more preferably a cationic group. The cationic group is preferably an —NHR group, a —CONHR group, or a salt thereof, more preferably an —$NH_2$ group (amino group), —$CONH_2$ group, —NH-$COCH_3$ group, or a salt thereof, and particularly preferably an —$NH_2$ group. The azo compound represented by the formula (I), which has X described above, is good in water-solubility, and can further form stable supermolecular aggregates when the compound is in a solution state. In particular, about the azo compound wherein X is a cationic group such as an amino group, X of the azo compound can form an intense ion bond with the —$SO_3M$ group of an adjacent molecule of the azo compound. For this reason, the azo compound wherein X is a cationic group can form supermolecular aggregates better in stability. Thus, a polarizing film containing the azo compound favorably exhibits a higher dichroic ratio.

In each of the formulae (I), (II) and (III), examples of M (counter ion) preferably include a hydrogen atom; an alkali metal atom such as Li, Na, K, Cs; an alkaline earth metal atom such as Ca, Sr, Ba; a metal ion. Examples of the metal ion include, for example, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, and the like.

The azo compound represented by the formula (I) can be obtained by, for example, a method described hereinafter. An aniline derivative having a substituent at the meta position thereof, and 1,6-Cleve's acid, which may also be called 5-amino-2-naphthalenesulfonic acid, are caused to undergo a diazotization reaction and a coupling reaction according to a conventional method, thereby yielding a monoazo compound. This monoazo compound is further caused to undergo a diazotization reaction, and then the resultant is caused to undergo a coupling reaction with an aryl derivative, thereby yielding the azo compound represented by the formula (I). Examples of the aniline derivative include 3'-aceto anilide, 3-nitroaniline, and 3-hydroxyaniline.

The azo compound exhibits absorption dichroism at wavelengths in at least one partial range within the wavelength range of 380 to 780 nm. The azo compound also exhibits liquid crystallinity (lyotropic liquid crystallinity) when the compound is in the state of a solution wherein the compound is dissolved in a solvent.

It is sufficient for the polarizing film of the invention to contain at least the azo compound. As far as the advantageous effects of the invention are not damaged, the polarizing film may contain different colorants, polymers, additives, and the like. Examples of the additive will be described later.

(Coating Liquid of the Present Invention and Method for Manufacturing of Polarizing Film Using it)

The polarizing film of the present invention can be obtained by coating the coating liquid containing the azo compound represented by the above formula (I) and a solvent which can dissolve the compound, on an appropriate substrate so that a thin film is formed, and drying the film, for example.

The polarizing film of the invention can be produced preferably through the following steps A and B and, if necessary, the following step C may be conducted after the step B.

Step A: a step of coating a coating liquid containing an azo compound and a solvent on a substrate so as to form a coating film.

Step B: a step of drying the coating film.

Step C: a step of performing water resistance treatment on a surface of the coating film dried in the step B.

Alignment regulating force can be applied to a surface of the substrate on which the coating liquid is to be coated.

The step A is a step of coating a coating liquid onto a substrate to form a coating film.

The coating liquid of the present invention contains the azo compound represented by the formula (I) and a solvent which can dissolve the azo compound.

The solvent is not particularly limited and a conventionally known one can be used, but the solvent is preferably an aqueous solvent. Examples of the aqueous solvent include water, a hydrophilic solvent, and mixed solvent containing water and the hydrophilic solvent. The hydrophilic solvent is a solvent, which can be dissolved with water uniformly. Examples of the hydrophilic solvent include, for example, alcohols such as methanol or isopropyl alcohol; glycols such as ethylene glycol; cellosolves such as methyl cellosolve or ethyl cellosolve; ketones such as acetone or methyl ethyl ketone; esters such as acetic ether; and the like. Preferably, the hydrophilic solvent is water or mixed solvent containing water and the hydrophilic solvent.

Since the azo compound has an —$SO_3M$ group, the compound is water-soluble, and is good in solubility, particularly, in the aqueous solvent.

The coating liquid exhibits a liquid crystal phase by changing temperature of the liquid or concentration of the azo compound.

The azo compound forms supermolecular aggregates in the coating liquid, and as a result, the coating liquid exhibits a liquid crystal phase. The type of the liquid crystal phase is not particularly limited, and a nematic liquid crystal phase, a smectic liquid crystal phase, a cholesteric liquid crystal phase, a hexagonal liquid crystal phase, and the like can be cited as examples. The liquid crystal phase can be identified and confirmed from an optical pattern when observed using a polarization microscope.

A concentration of the azo compound in the coating liquid is preferably prepared so as to exhibit a liquid crystal phase. The concentration of the azo compound in the coating liquid is from 0.5 to 50% by mass and preferably from 1 to 30% by mass.

In addition, a pH of the coating liquid is prepared appropriately. The pH of the coating liquid is preferably about pH 2 to 10 and more preferably about pH 6 to 8.

Further, the temperature of the coating liquid is preferably prepared from 10° C. to 40° C. and more preferably from 15° C. to 30° C.

Further, an additive may be added to the coating liquid. Examples of the additive include, for example, a compatibilizing agent, a surfactant, a heat stabilizer, a light stabilizer, a lubricant, an antioxidant, a flame retardant, an antistatic agent, and the like. When an additive is added in the coating liquid, the amount of the additive in the coating liquid is preferably more than 0 part by mass and 10 parts by mass or less with respect to 100 parts by mass of the azo compound.

The substrate is used for uniformly developing of the coating liquid. The substrate is not particularly limited as far as it is proper to the object. Examples of the substrate include a sheet such as a polymer film, a glass plate, or the like. The substrate may be a metallic drum. The coating liquid is coated onto the sheet or the metallic drum, whereby an azo-compound-containing coating film in a thin-film form can be formed.

In a preferable embodiment, an alignment substrate is used as the substrate. The alignment substrate is a substrate having, on at least one surface thereof, alignment regulating force. When the coating liquid is coated onto the alignment substrate, the azo compound can easily be aligned.

The polymer film is not particularly limited, however, a film being excellent in transparency is preferable (for example, having a haze value of 3% or less).

Examples of material of the polymer film include polyester based polymers such as polyethylene terephthalate; cellulose based polymers such as triacetylcellulose; polycarbonate based polymers; acryl based polymers such as polymethyl methacrylate; styrene based polymers such as polystyrene; olefin based polymers such as polypropylene or polyolefins having a cyclic or norbornene structure; and the like. The norbornene based polymer film is preferably used for aligning the azo compound excellently.

The alignment substrate is obtained by giving alignment regulating force to a surface of a substrate (for example, a polymer film), or to a surface layer formed on a surface of the same substrate.

The method for giving the alignment regulating force is not particularly limited. Examples of the method include a method of subjecting a surface of the substrate to rubbing treatment; a method of forming a surface layer made of a polyimide or the like on the substrate, and then subjecting the surface layer to rubbing treatment; and a method of forming a surface layer containing a compound that can undergo an optical reaction (such as optical isomerization, optical dimerization, or optical decomposition) on the substrate, and then irradiating the surface layer with light, thereby giving directivity onto the surface layer.

A thickness of the substrate in a sheet form can be suitably designed in accordance with the strength and the like. However, in terms of thickness reduction and weight reduction, the thickness is preferably 300 μm or less, more preferably from 5 to 200 μm, and particularly preferably from 10 to 100 μm.

In the case where the coating liquid is coated on a surface of the substrate in a sheet form, a coating method using a suitable coater can be adopted. Examples of the coater include a bar coater, a reverse roll coater, a positive rotation roll coater, a gravure coater, a rod coater, a slot die coater, a slot orifice coater, a curtain coater, a fountain coater, and the like. In the case where the coating liquid is coated on the substrate such as a metallic drum, an appropriate solution casting method can be adopted.

When a coating liquid in such a state as to exhibit a liquid crystal phase is coated, shearing stress is applied to the supermolecular aggregates in a process where the coating liquid flows, so that long axis direction of the supermolecular aggregates becomes parallel to the flow direction of the coating liquid, and a coating film where supermolecular aggregates of the azo compound are aligned can be formed on the substrate. Also, when the substrate is an alignment substrate, the azo compound is aligned in response to alignment regulating force thereof.

If necessary, a magnetic field or an electrical field may be applied after the formation of a coating film so as to improve the alignment of the azo compound.

The step B is a step of drying the coating film.

After the formation of the coating film by coating the coating liquid onto the substrate, the workpiece is dried.

The drying may be natural drying, forcible drying, or the like. Examples of the forcible drying include drying under reduced pressure, drying by heating, and drying by heating under reduced pressure. The drying in the step B is preferably natural drying.

The drying time can be suitably selected in accordance with the drying temperature and the kind of the solvent. For example, when the natural drying is adopted, the drying time is preferably 1 second to 120 minutes and more preferably 10 seconds to 5 minutes.

The above coating film will have a higher concentration in the drying process and, in accordance therewith, the azo compound will be aligned and will be fixed in that state. An absorption dichroism, which is a property of a polarizing film, is generated by fixing the alignment of the azo compound in the coating film. The obtained dried coating film can be used as a polarizing film. The amount of the solvent remaining in the polarizing film is preferably 5% by mass or less with respect to total mass of the polarizing film. It is preferred that the drying is conducted until the amount of the solvent remaining in the polarizing film becomes 5% by mass or less.

The step C is a step of imparting water resistance to the surface of the dried coating film (the surface opposite to the bonded surface of the substrate).

Concretely, the surface of the dried coating film formed in the step B is brought into contact with a solution containing at least one kind of a compound salt selected from the group consisting of aluminum salt, barium salt, lead salt, chromium salt, strontium salt, ceric salt, lanthanum salt, samarium salt, yttrium salt, copper salt, iron salt, and compound salts having two or more amino groups in a molecule.

When the step C is conducted, a layer containing the compound salt is formed on the surface of the dried coating film. The formation of this layer makes it possible to make the surface of the dried coating film insoluble in water or hardly soluble in water. Thus, water resistance can be given to the dried coating film (polarizing film).

If necessary, the surface of the resultant polarizing film may be washed with water or a washing solution.

(Properties of Polarizing Film of the Present Invention)

The polarizing film of the present invention has absorption dichroism at wavelengths in at least one partial range within the wavelength range of 380 to 780 nm since the supermolecular aggregates of the azo compound are aligned in a predetermined direction. The dichroic ratio of the polarizing film is preferably 15 or more and more preferably 20 or more. The dichroic ratio can be obtained by the method described in Examples, which will be described later.

The inventors presume that the reason why the polarizing film containing an azo compound represented by the formula (I) exhibits a high dichroic ratio (for example, 15 or more) is as follows: Two adjacent molecules of an azo compound represented by the formula (I) are bonded to each other by electrostatic interaction so that the molecules can form a stable supermolecular aggregate in a solution containing this compound. Specifically, as illustrated in FIG. 1, the substituent X bonded to the meta position of an independent benzene ring (represented by symbol B1) in one out of two molecules of an azo compound represented by the formula (I) is bonded to the —$SO_3M$ group in the 6-sulfo-1,4-naphthalene ring (represented by symbol N2) in the other molecule by electrostatic interaction (represented by one out of two dot lines). Simultaneously, the —$SO_3M$ group in the 6-sulfo-1,4-naphthalene ring (represented by symbol N1) in the firstly mentioned molecule is bonded to the substituent X bonded to the meta position of an independent benzene ring (represented by symbol B2) in the other molecule by electrostatic interaction (represented by the other dot line). In such a way, any adjacent two molecules of the azo compound are bonded to each other, whereby supermolecular aggregates are stabilized. For this reason, the alignment property of the azo compound is improved, so that the polarizing film, which contains the azo compound, exhibits a high dichroism. When X in the formula (I) is, in particular, a cationic group, the cationic groups and the —$SO_3M$ groups of the adjacent molecules can form ion bonds, so that supermolecular aggregates better in stability are formed. For this reason, it is more preferable to use an azo compound wherein X in the formula (I) is a cationic group.

The degree of polarization of the polarizing film is preferably 90% or more and more preferably 95% or more. The transmittance of the polarizing film (at a wavelength of 550 nm measured at 23° C.) is preferably 35% or more and more preferably 40% or more. The transmittance can be measured using, for example, a spectrophotometer (product name: "V-7100", manufactured by JASCO Corp.).

The thickness of the polarizing film is not particularly limited. Since the polarizing film of the present invention can be produced by a solution casting method as described above, the film can be made to have a smaller thickness. Specifically, the thickness of the polarizing film is preferably from 0.1 to 5 μm and more preferably from 0.1 to 3 μm.

(Usage and Others of Polarizing Film of the Present Invention)

Figure 2:
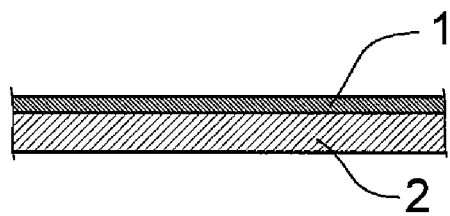
FIG. 2 is a partial sectional view illustrating a polarizing film according to an embodiment of the present invention.

A polarizing film 1 obtained by coating the coating liquid onto the substrate in a sheet form is, as illustrated in FIG. 2, laminated on a substrate 2 in a sheet form.

In general, the polarizing film 1 of the present invention is used in such a state as to be laminated on the substrate 2. However, the polarizing film 1 of the present invention can also be used separately from the substrate 2.

The polarizing film 1 of the present invention may be further laminated other optical film. Examples of the other optical film include a protective film, a retardation film, and the like. A polarizing plate can be constituted by laminating the protective film and/or the retardation film on the polarizing film of the present invention.

Figure 3:
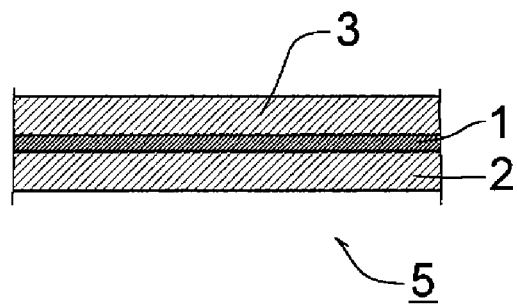
FIG. 3 is a partial sectional view illustrating a polarizing plate according to an embodiment of the present invention.

FIG. 3 illustrates a polarizing plate 5 wherein a protective film 3 is laminated on a polarizing film 1 of the present invention. This polarizing plate 5 has a substrate 2, the polarizing film 1 laminated on the substrate 2, and the protective film 3 laminated on the polarizing film 1. The substrate 2 has a function of protecting the polarizing film 1. Thus, in the polarizing plate 5, the protective film 3 is laminated on only one of the surfaces of the polarizing film 1.

A retardation film, or one or more other optical films, which are not illustrated, may be laminated on this polarizing plate 5.

In the case where the other optical film is laminated on the polarizing film, in practice, an appropriate adhesive layer is provided between these. Examples of the material for forming the adhesive layer include, for example, an adhesive agent, a pressure-sensitive adhesive agent, an anchor coating agent, and the like.

The usage of the polarizing film of the present invention is not particularly limited. The polarizing film of the present invention is used as a constitution member of image displays such as a liquid crystal display, an organic EL display, and the like.

In the case where the image display is a liquid crystal display, preferable usage thereof is a television set, a portable telephone, a clock, a video camera, and the like.

EXAMPLE

In the following, Examples and Comparative Examples are given in order to further describe the present invention. Here, the present invention is not limited only to the following Examples. The methods for analysis used in the Examples and Comparative Examples are as follows.

[Method for Observing Liquid Crystal Phase]

A small amount of a coating liquid was sandwiched between two glass slides, and then the liquid crystal phase thereof was observed with a polarizing microscope (product name: "OPTIPHOT-POL", manufactured by Olympus Corp.) equipped with a large-sized-sample heating and cooling, microscope-fittable stage (product name: "10013 L", manufactured by Japan High Tech Co., Ltd.).

[Method for Measuring Thickness of Polarizing Film]

A portion of the polarizing film formed on a norbornene based polymer film was peeled and the thickness was measured as a step between the film and the polarizing film using a three-dimensional non-contact surface form measuring system (product name: "Micromap MM5200," manufactured by Ryoka Systems Inc.).

[Method for Measuring Dichroic Ratio (DR)]

A spectrophotometer (product name: "V-7100", manufactured by JASCO Corp.) was used to measure each of the polarization transmission spectrum ($k_1$) and that ($k_2$) of a polarizing film in the wavelength range of 380 to 780 nm. The polarization transmission spectrum ($k_1$) is the transmission spectrum when polarized light having an electric field vector parallel to the transmission axis of the polarizing film is emitted into the polarizing film, and the polarization transmission spectrum ($k_2$) is the transmission spectrum when polarized light having an electric field vector perpendicular to the transmission axis of the polarizing film is emitted into the polarizing film. From the measured polarization transmission spectra ($k_1$) and ($k_2$), the tristimulus values ($Y_1$) and ($Y_2$) were each calculated out. The values were assigned to an expression of $DR=\log(1/Y_2)/\log(1/Y_1)$, thereby calculating the dichroic ratio (DR).

Example 1

In accordance with a method described in the following document, 3'-acetoanilide and 5-amino-2-naphthalenesulfonic acid were caused to undergo a diazotization reaction and a coupling reaction, thereby yielding a monoazo compound. This monoazo compound was diazotized in accordance with the same document, and then caused to undergo a coupling reaction with lithium 1-amino-8-naphthol-2,4-disulfonate. Acetyl groups of the resultant were hydrolyzed with lithium hydroxide. The resultant crude product was subjected to salting-out with lithium chloride to yield an azo compound represented by the following structural formula (IV).

(Document) pages 135-152 of "Theoretical Production, Dye Chemistry (fifth edition)" written by Yutaka Hosoda and published by Gihodo Shuppan Co., Ltd. on Jul. 15, 1968.

(IV)

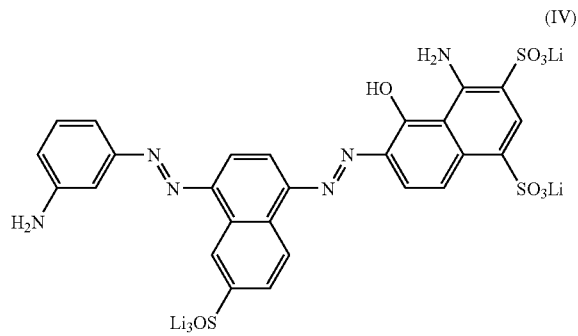

The azo compound represented by the structural formula (IV) was dissolved in ion exchange water to prepare a coating liquid wherein the concentration of the compound was 20% by mass. This coating liquid was observed at 23° C. by the above-mentioned method for observing a liquid crystal phase. As a result, a nematic liquid crystal phase was observed.

Ion exchange water was further added to the coating liquid to prepare a coating liquid wherein the concentration of the compound was 5% by mass. A norbornene based polymer film (trade name: "ZEONOA" manufactured by Zeon Corporation) subjected to rubbing treatment and corona treatment was prepared, and then a bar coater (product name: "Mayer rot HS3", manufactured by Bushman Co.) was used to coat the coating liquid onto the treated surface of the film. The resultant was naturally dried in a thermostat of 23° C. for 300 seconds. The dried coating film was a polarizing film.

The thickness of the resultant polarizing film was 0.4 μm. The dichroic ratio of the polarizing film is shown in Table 1.

Example 2

In accordance with a method described in the above document, 3-nitroaniline and 5-amino-2-naphthalenesulfonic acid were caused to undergo a diazotization reaction and a coupling reaction, thereby yielding a monoazo compound. This monoazo compound was diazotized in accordance with the same document, and then caused to undergo a coupling reaction with lithium 1-amino-8-naphthol-2,4-disulfonate. The resultant crude product was subjected to salting-out with lithium chloride to yield an azo compound represented by the following structural formula (V).

(V)

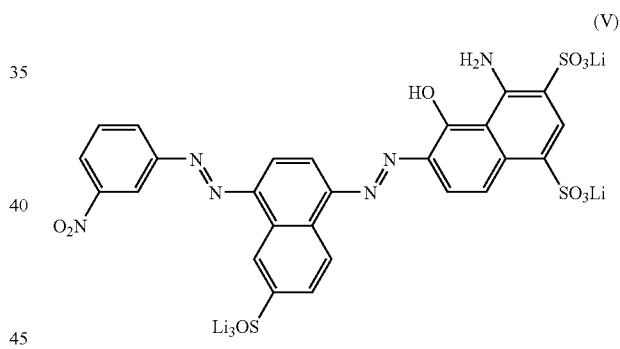

The azo compound represented by the structural formula (V) was dissolved in ion exchange water to prepare a coating liquid wherein the concentration of the compound was 20% by mass. This coating liquid was observed at 23° C. by the above-mentioned method for observing a liquid crystal phase. As a result, a nematic liquid crystal phase was observed.

Ion exchange water was further added to the coating liquid to prepare a coating liquid wherein the concentration of the compound was 5% by mass. The coating liquid was coated on a norbornene based polymer film by the same method as in the Example 1, and the polarizing film having a thickness of 0.4 μm was formed. The dichroic ratio of the polarizing film is shown in Table 1.

Comparative Example 1

The azo compound represented by the following structural formula (VI) was obtained by the same method as in the Example 1 except that 5-amino-2-naphthalenesulfonic acid was replaced with 8-amino-2-naphthalenesulfonic acid.

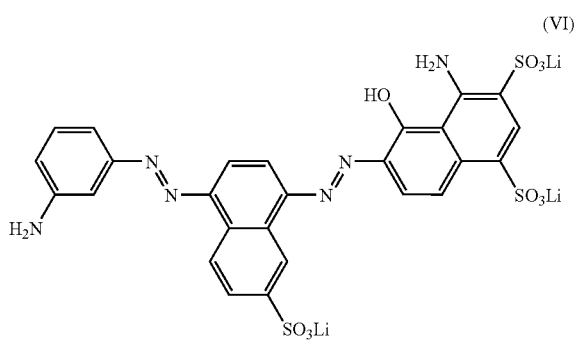

(VI)

The azo compound represented by the structural formula (VI) was dissolved in ion exchange water to prepare a coating liquid wherein the concentration of the compound was 20% by mass. This coating liquid was observed at 23° C. by the above-mentioned method for observing a liquid crystal phase. As a result, a nematic liquid crystal phase was observed.

Ion exchange water was further added to the coating liquid to prepare a coating liquid wherein the concentration of the compound was 5% by mass. The coating liquid was coated on a norbornene based polymer film by the same method as in the Example 1, and the polarizing film having a thickness of 0.4 μm was formed. The dichroic ratio of the polarizing film is shown in Table 1.

Comparative Example 2

The azo compound represented by the following structural formula (VII) was obtained by the same method as in the Example 2 except that 5-amino-2-naphthalenesulfonic acid was replaced with 8-amino-2-naphthalenesulfonic acid.

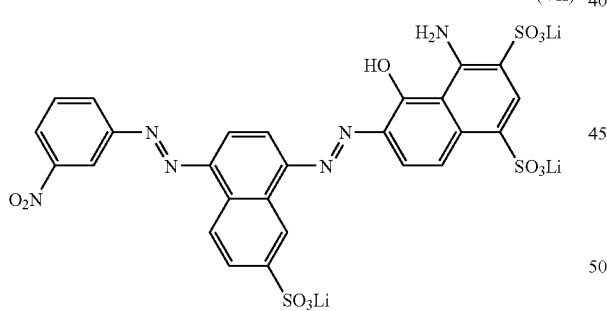

(VII)

The azo compound represented by the structural formula (VII) was dissolved in ion exchange water to prepare a coating liquid wherein the concentration of the compound was 20% by mass. This coating liquid was observed at 23° C. by the above-mentioned method for observing a liquid crystal phase. As a result, a nematic liquid crystal phase was observed.

Ion exchange water was further added to the coating liquid to prepare a coating liquid wherein the concentration of the compound was 5% by mass. The coating liquid was coated on a norbornene based polymer film by the same method as in the Example 1, and the polarizing film having a thickness of 0.4 μm was formed. The dichroic ratio of the polarizing film is shown in Table 1.

TABLE 1

|  | Azo compound | Dichroic ratio |
| --- | --- | --- |
| Example 1 | Structural formula (IV) | 23 |
| Example 2 | Structural formula (V) | 17 |
| Comparative Example 1 | Structural formula (VI) | 6 |
| Comparative Example 2 | Structural formula (VII) | 8 |

[Evaluation]

As compared with Comparative Examples 1 and 2, the polarizing films of Examples 1 and 2 each had a higher dichroic ratio. The use of, in particular, the azo compound having, at the meta position thereof, an amino group (the structural formula (IV) of Example 1) makes it possible to form a polarizing film exhibiting a high dichroic ratio.

The polarizing film of the present invention may be used in, for example, a constituting member of a liquid crystal display, or polarizing sunglasses.

The coating liquid of the present invention may be used as a forming material for a polarizing film.

What is claimed is:

1. A polarizing film, comprising an azo compound represented by the following general formula (I):

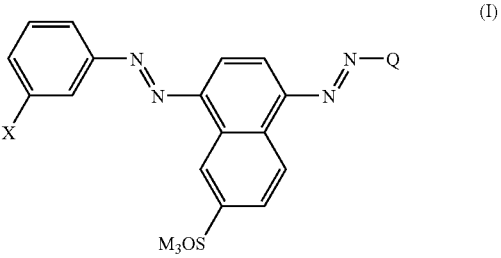

(I)

wherein X represents a cationic group, a nitro group, a cyano group, or a hydroxyl group, Q is selected from the group consisting of formulae (a)-(c) and (h)-(l):

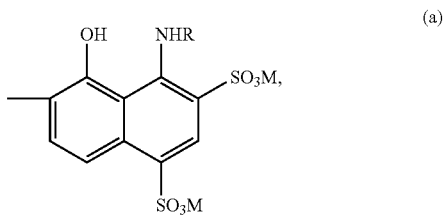

(a)

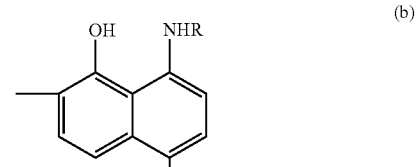

(b)

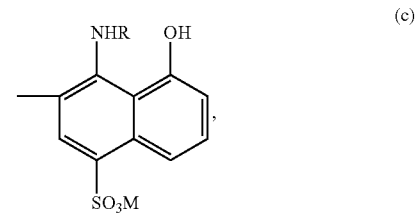

(c)

-continued

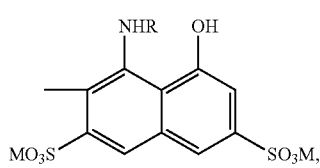
(h)

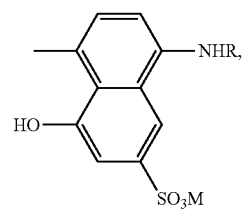
(i)

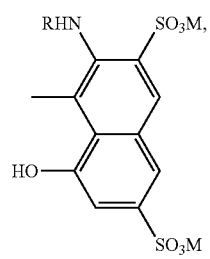
(j)

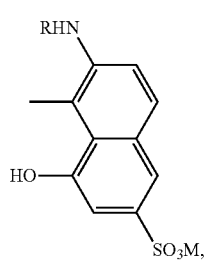
(k)

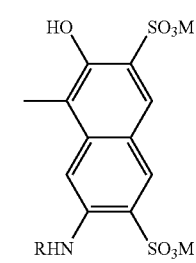
(l)

wherein R is selected from the group consisting of hydrogen atom, an alkyl group having 1 to 3 carbon atoms, and an acyl group having 1 to 3 carbon atoms and M in general formula (1) and M in formulae (a)-(c) and (h)-(l) are selected from a counter ion.

2. The polarizing film according to claim 1, wherein X is a cationic group or a nitro group.

3. The polarizing film according to claim 1, wherein X is a cationic group and the cationic group is an —NHR group, or a —CONHR group, and R in the cationic group represents a hydrogen atom, a methyl group, an ethyl group, a methoxy group, or an ethoxy group.

4. A coating liquid, comprising an azo compound represented by the following general formula (I), and a solvent:

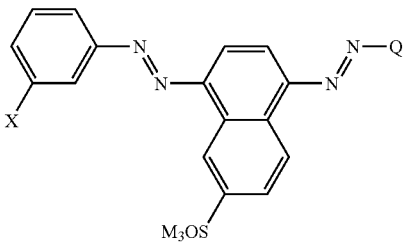
(I)

wherein X represents a cationic group, a nitro group, a cyano group, or a hydroxyl group, Q is selected from the group consisting of formulae (a)-(c) and (h)-(l):

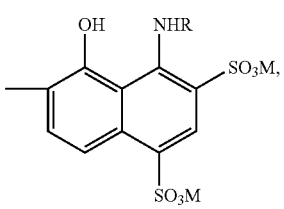
(a)

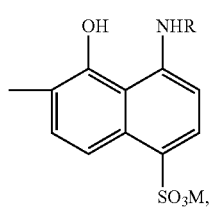
(b)

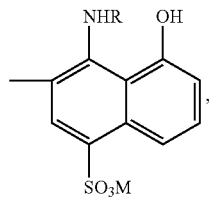
(c)

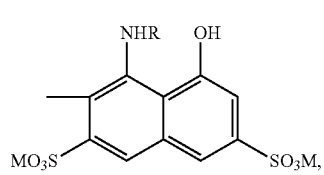
(h)

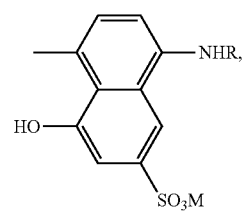
(i)

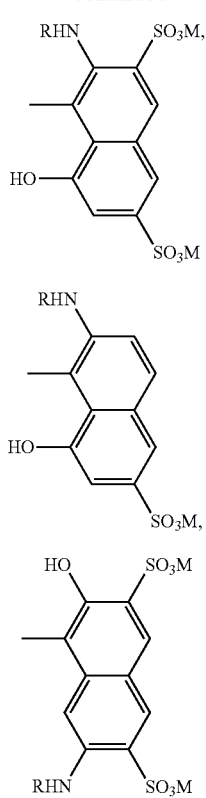

(j)

(k)

(l)

wherein R is selected from the group consisting of hydrogen atom, an alkyl group having 1 to 3 carbon atoms, and an acyl group having 1 to 3 carbon atoms and M in general formula (1) and M in formulae (a)-(c) and (h)-(l) are selected from a counter ion.

5. An image display having the polarizing film as recited in claim 1.

6. The polarizing film according to claim 1, wherein M is selected from the group consisting of an alkali metal atom and an alkaline earth metal atom.

7. The polarizing film according to claim 1, wherein the polarizing film has a degree of polarization of 95% or more.

8. The coating liquid according to claim 4, wherein the coating liquid has a pH of 6 to 8.

9. The coating liquid according to claim 4, wherein M is selected from the group consisting of an alkali metal atom and an alkaline earth metal atom.

10. The coating liquid according to claim 4, wherein X is a cationic group or a nitro group.

11. The coating liquid according to claim 4, wherein X is a cationic group and the cationic group is an —NHR group, or a —CONHR group, and R in the cationic group represents a hydrogen atom, a methyl group, an ethyl group, a methoxy group, or an ethoxy group.

* * * * *